(12) United States Patent
Zhong et al.

(10) Patent No.: US 9,747,524 B2
(45) Date of Patent: Aug. 29, 2017

(54) DISPARITY VALUE DERIVING DEVICE, EQUIPMENT CONTROL SYSTEM, MOVABLE APPARATUS, AND ROBOT

(71) Applicants: Wei Zhong, Dan Dong (CN);
Yoshikazu Watanabe, Tokyo (JP);
Soichiro Yokota, Kanagawa (JP);
Kiichiroh Saitoh, Kanagawa (JP);
Ryohsuke Tamura, Kanagawa (JP)

(72) Inventors: Wei Zhong, Dan Dong (CN);
Yoshikazu Watanabe, Tokyo (JP);
Soichiro Yokota, Kanagawa (JP);
Kiichiroh Saitoh, Kanagawa (JP);
Ryohsuke Tamura, Kanagawa (JP)

(73) Assignee: RICOH COMPANY, LTD., Tokyo (JP)

( * ) Notice: Subject to any disclaimer, the term of this patent is extended or adjusted under 35 U.S.C. 154(b) by 0 days.

(21) Appl. No.: 14/628,905

(22) Filed: Feb. 23, 2015

(65) Prior Publication Data

US 2015/0248594 A1 Sep. 3, 2015

(30) Foreign Application Priority Data

Feb. 28, 2014 (JP) .................................. 2014-039085
Jan. 5, 2015 (JP) .................................. 2015-000312

(51) Int. Cl.
*G06K 9/62* (2006.01)
*B60R 11/04* (2006.01)
(Continued)

(52) U.S. Cl.
CPC ............ *G06K 9/6215* (2013.01); *B60R 11/04* (2013.01); *G06K 9/46* (2013.01); *G06K 9/4661* (2013.01);
(Continued)

(58) Field of Classification Search
CPC ......... G06T 7/0075; G06T 2207/10012; G06T 2207/10028; G06T 2207/20228;
(Continued)

(56) References Cited

U.S. PATENT DOCUMENTS 5,768,404 A * 6/1998 Morimura ................ G06K 9/20
348/E13.014
6,215,898 B1 * 4/2001 Woodfill .................. G06K 9/32
348/47
(Continued)

FOREIGN PATENT DOCUMENTS

CN 101231754 A 7/2008
CN 103310421 A 9/2013
(Continued)

OTHER PUBLICATIONS

Extended European Search Report issued Dec. 4, 2015 in Patent Application No. 15153964.0.
(Continued)

*Primary Examiner* — Kim Vu
*Assistant Examiner* — Michael Vanchy, Jr.
(74) *Attorney, Agent, or Firm* — Oblon, McClelland, Maier & Neustadt, L.L.P.

(57) ABSTRACT

A disparity value deriving device includes an acquisition unit configured to acquire a degree of matching between a reference region in a reference image captured from a first imaging position and each of a plurality of region in a designated range including a corresponding region to the reference region in a comparison image captured from a second imaging position; a synthesizer configured to synthesize the degree of matching of a reference region in neighborhood of a predetermined reference region in the reference image and the degree of matching of the predetermined reference region in the reference image; and a
(Continued)

deriving unit configured to derive a disparity value of an object whose image is being captured in the predetermined reference region and a corresponding region to the predetermined reference region, based on a synthesized degree of matching obtained by the synthesizer.

18 Claims, 13 Drawing Sheets

(51) Int. Cl.
*G06K 9/46* (2006.01)
*G06T 7/593* (2017.01)

(52) U.S. Cl.
CPC ...... *G06T 7/593* (2017.01); *G06K 2009/4666* (2013.01); *G06T 2207/10021* (2013.01); *G06T 2207/30261* (2013.01); *Y10S 901/46* (2013.01)

(58) Field of Classification Search
CPC .. G06T 2207/10021; H04N 2013/0081; G06K 9/6215
See application file for complete search history.

(56) References Cited

U.S. PATENT DOCUMENTS

| | | | |
|---|---|---|---|
| 2006/0120712 A1* | 6/2006 | Kim | G06T 7/0075 396/333 |
| 2013/0071013 A1* | 3/2013 | Ogata | H04N 13/0022 382/154 |
| 2013/0083994 A1* | 4/2013 | Ren | G06T 7/593 382/154 |
| 2014/0267630 A1 | 9/2014 | Zhong | |

FOREIGN PATENT DOCUMENTS

| | | |
|---|---|---|
| JP | 07-332970 | 12/1995 |
| JP | 08-136220 | 5/1996 |
| JP | 10-289315 | 10/1998 |
| JP | 2001-153633 | 6/2001 |
| JP | 2009-282635 | 12/2009 |
| JP | 2012-181142 | 9/2012 |
| JP | 2012-198077 | 10/2012 |
| JP | 2015-143677 A | 8/2015 |
| WO | WO 2009/097714 A1 | 8/2009 |
| WO | WO 2012/128068 A1 | 9/2012 |
| WO | WO 2014/108130 A1 | 7/2014 |
| WO | WO 2015/088044 A1 | 6/2015 |

OTHER PUBLICATIONS

Stefan K. Gehrig, et al., "Improving Stereo Sub-Pixel Accuracy for Long Range Stereo" Computer Vision, ICCV 2007, IEEE 11th International Conference O N, IEEE, PI, XP031194701, Oct. 1, 2007, 7 Pages.
Heiko Hirschmuller, "Accurate and Efficient Stereo Processing by Semi-Global Matching and Mutual Information," 2005.
Combined Office Action and Search Report issued Aug. 3, 2016 in Chinese Patent Application No. 201510088844.0 (with English language translation).
Chinese Office Action issued Feb. 17, 2017 in Chinese Application No. 201510088844.0 (with translation), 17 pages.
European Office Action issued Feb. 24, 2017 in European Application No. 15 153 964.0 (6 pages).
Ramin Zabih et al., "Non-parametric Local Transforms for Computing Visual Correspondence", May 2, 1994 (May 2, 1994), Network and Parallel Computing; [Lecture Notes in Computer Science; Lect. Notes Computer], Springer International Publishing, Cham, pp. 151-158, XP047289384, 8 pages.

* cited by examiner

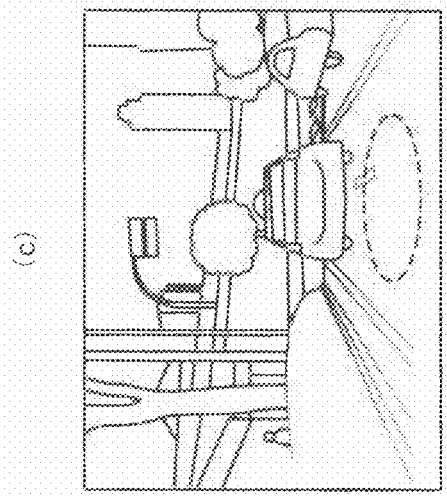
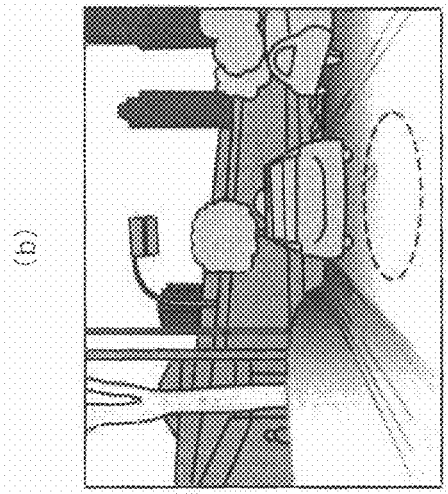
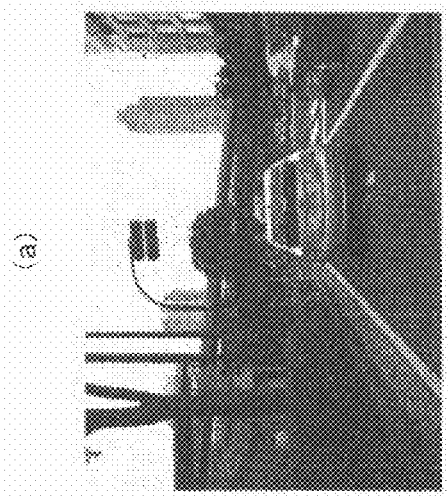
FIG.2

FIG.7
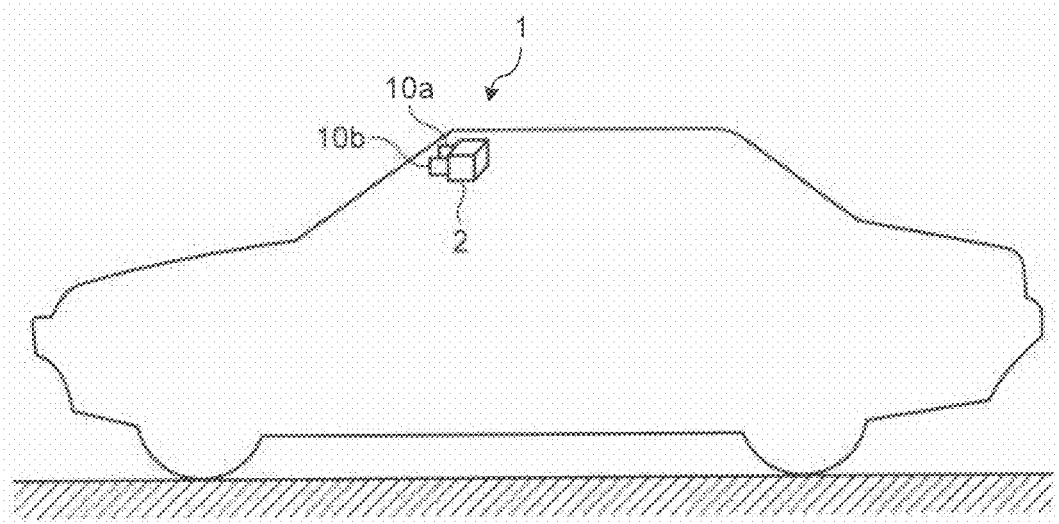
(a)
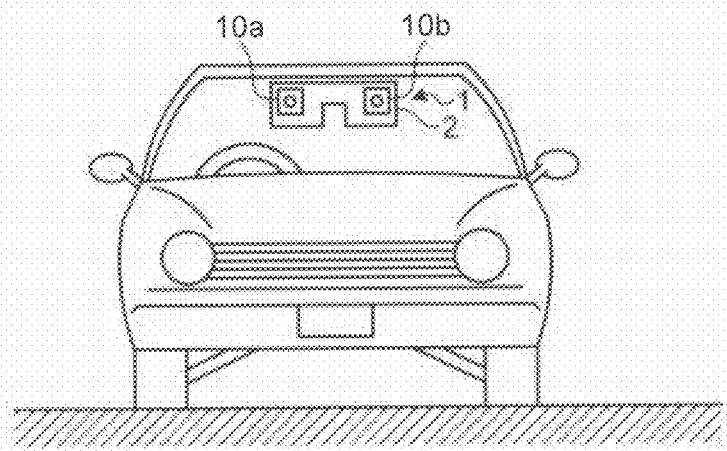
(b)

FIG.18
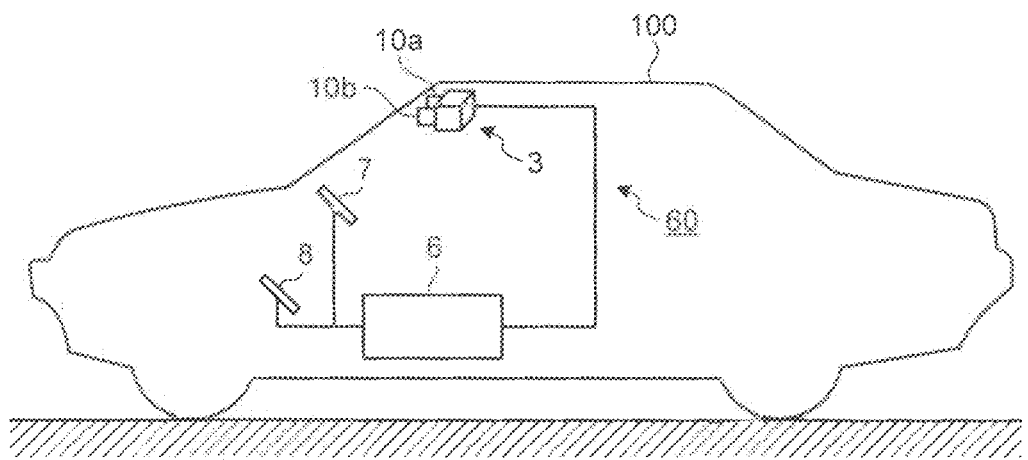
(a)
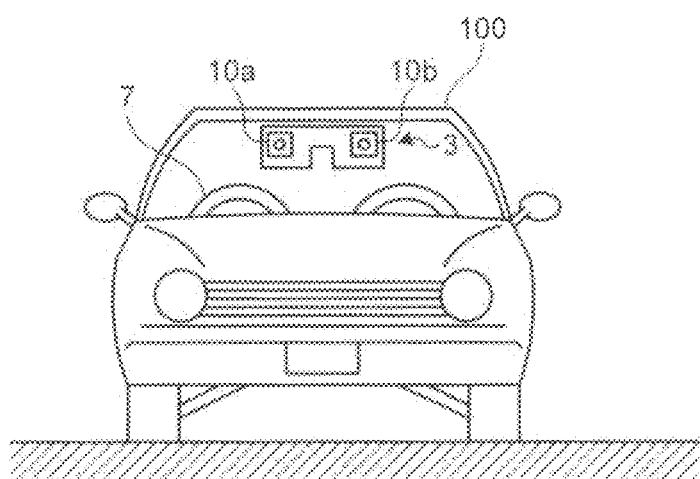
(b)

DISPARITY VALUE DERIVING DEVICE, EQUIPMENT CONTROL SYSTEM, MOVABLE APPARATUS, AND ROBOT

CROSS-REFERENCE TO RELATED APPLICATIONS

The present application claims priority to and incorporates by reference the entire contents of Japanese Patent Application No. 2014-039085 filed in Japan on Feb. 28, 2014 and Japanese Patent Application No. 2015-000312 filed in Japan on Jan. 5, 2015.

BACKGROUND OF THE INVENTION

1. Field of the Invention

The present invention relates to disparity value deriving devices, equipment control systems, movable apparatuses, and robots.

2. Description of the Related Art

In recent years, vehicle-mounted systems have generally been used for preventing automobile collisions by measuring the distance between automobiles or the distance between an automobile and an obstacle. A stereo matching process using the principle of triangulation using a stereo camera has been used as a method of measuring the distance. The stereo matching process is a process of obtaining disparity by matching corresponding pixels between a reference image captured by one of two cameras of a stereo camera and a comparison image captured by the other camera, and calculating the distance between the stereo camera and an object included in the images from the disparity. The calculation of the distance to an object by this stereo matching process using a stereo camera enables a variety of recognition processing, and brake control and steering control for preventing collisions.

The stereo matching process as described above includes the block matching method in which, in order to evaluate the similarity between images, regions are cut out from the images to be compared and, for example, the sum of absolute differences (SAD) of luminance, the sum of squared differences (SSD), and the zero-mean normalized cross-correlation (ZNCC) are obtained for the regions. However, it is difficult to extract image features in a portion where texture indicating the amount of change in luminance of an object in an image is weak, and the block matching method may not provide accurate disparity. A technique is then proposed as a method for deriving precise disparity, in which not only the cost of a pixel in a comparison image for a corresponding reference pixel in a reference image but also the costs of pixels in the neighborhood of the pixel in the comparison image are aggregated to derive disparity for an object with weak texture (see Japanese Patent Application Laid-open No. 2012-181142).

The technique described in Japanese Patent Application Laid-open No. 2012-181142, however, uses much memory and increases the image processing load due to the stereo matching process because the value of aggregated costs is obtained for each of the pixels continuously arranged to form an image. It is therefore difficult to obtain a disparity image configured with disparity values real-time.

Therefore, there is a need to provide a disparity value deriving device, an equipment control system, a movable apparatus, and a robot that are capable of reducing the image processing load and reducing the time required for deriving disparity values.

SUMMARY OF THE INVENTION

It is an object of the present invention to at least partially solve the problems in the conventional technology.

According to an embodiment, there is provided a disparity value deriving device that includes an acquisition unit configured to acquire a degree of matching between a reference region in a reference image captured from a first imaging position and each of a plurality of regions in a designated range including a corresponding region corresponding to the reference region in a comparison image captured from a second imaging position; a synthesizer configured to synthesize the degree of matching of a reference region in neighborhood of a predetermined reference region in the reference image and the degree of matching of the predetermined reference region in the reference image; and a deriving unit configured to derive a disparity value of an object whose image is being captured in the predetermined reference region and the corresponding region corresponding to the predetermined reference region, based on a synthesized degree of matching obtained by the synthesizer. At least a part of the regions in the designated range is displaced two or more pixels in a closest region in a predetermined direction.

According to another embodiment, there is provided a disparity value deriving device for deriving a disparity value representing disparity for an object from a reference image obtained by a first imaging unit capturing an image of the object and a comparison image obtained by a second imaging unit capturing another image of the object. The disparity value deriving device includes an acquisition unit configured to calculate respective degrees of matching of a plurality of candidate regions each serving as candidates for a corresponding region in the comparison image corresponding to a first reference region in the reference image, based on a luminance value of the first reference region and luminance values of the candidate regions specified by shifting positions by shift amounts included in features obtained by partially removing predetermined shift amounts from a predetermined shift range, from a region corresponding to a position of the first reference region, on an epipolar line in the comparison image based on the first reference region; a synthesizer configured to calculate a synthesized degree of matching of each of the candidate regions by aggregating the degree of matching in the comparison image for a second reference region in neighborhood of the first reference region, with the degree of matching of the candidate region, based on the shift amounts included in the features; and a deriving unit configured to derive the disparity value, based on the shift amount corresponding to a first extreme of the synthesized degrees of matching of the respective candidate regions in the comparison image.

According to still another embodiment, there is provided a disparity value deriving device that includes an acquisition unit configured to acquire a degree of matching between a reference region in a reference image captured from a first imaging position and each of a plurality of discontinuous regions in a designated range including a corresponding region corresponding to the reference region in a comparison image captured from a second imaging position; a synthesizer configured to synthesize the degree of matching of a reference region in neighborhood of a predetermined reference region in the reference image and the degree of matching of the predetermined reference region in the reference image; and a deriving unit configured to derive a disparity value of an object whose image is being captured in the predetermined reference region and the corresponding region corresponding to the predetermined reference region, based on a synthesized degree of matching obtained by the synthesizer.

The above and other objects, features, advantages and technical and industrial significance of this invention will be better understood by reading the following detailed description of presently preferred embodiments of the invention, when considered in connection with the accompanying drawings.

BRIEF DESCRIPTION OF THE DRAWINGS

FIG. 2 illustrates (a) an example of a reference image, (b) an example of a high density disparity image, and (c) an example of an edge disparity image;

FIG. 7 illustrates an automobile equipped with a disparity value deriving device according to an embodiment of the present invention;

FIG. 18 is a diagram illustrating an example of an equipment control system according to the present embodiment mounted on a vehicle.

DETAILED DESCRIPTION OF THE PREFERRED EMBODIMENTS

Embodiments of the present invention will be described below with reference to the accompanying drawings.

Overview of Distance Measurement Method Using SGM Method

Referring first to FIG. 1 to FIG. 6, an overview of a distance measurement method using the semi-global matching (SGM) method will be described. The SGM method is disclosed in Accurate and Efficient Stereo Processing by Semi-Global Matching and Mutual Information) and a brief explanation is given below.

Principle of Distance Measurement

Figure 1:
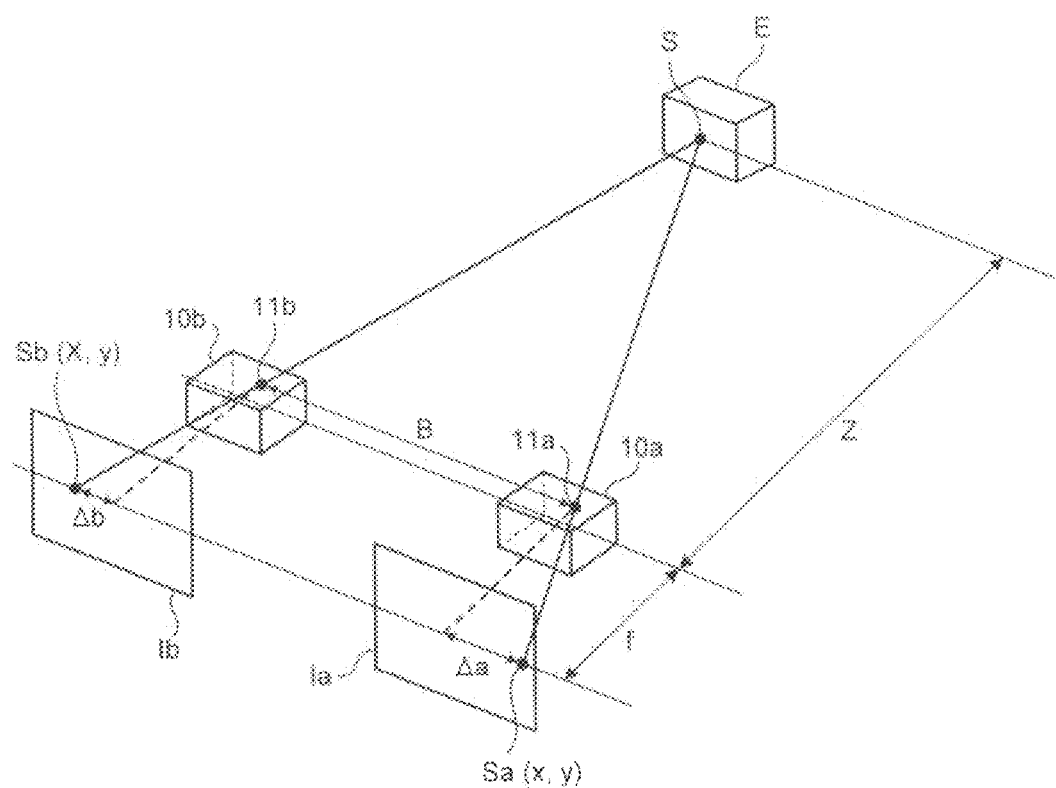
FIG. 1 is an illustration of the principle of deriving the distance from an imaging device to an object.

Referring to FIG. 1, the principle of measuring the distance from a stereo camera to an object will be described, in which disparity of the object is derived as a disparity value by conducting stereo imaging using the stereo camera, and the disparity value is used to measure the distance from the stereo camera to the object. FIG. 1 is an illustration of the principle of deriving the distance from imaging devices to an object. The following description explains processes with respect to each single pixel rather than with respect to each predetermined region including a plurality of pixels, to make the explanation simpler. When the process is performed not in units of single pixels but in units of predetermined regions each including a plurality of pixels, the predetermined region that includes a reference pixel is denoted as a reference region, and the predetermined region that includes a corresponding pixel is denoted as a corresponding region. The reference region may include a reference pixel alone and the corresponding region may include a corresponding pixel alone.

Disparity Value Calculation

The images captured by an imaging device $10a$ and an imaging device $10b$ illustrated in FIG. 1 are denoted as a reference image Ia and a comparison image Ib, respectively. In FIG. 1, the imaging device $10a$ and the imaging device $10b$ are installed parallel and at the same height. In FIG. 1, a point S on an object E in a three-dimensional space is captured at one position of the imaging device $10a$ and also at one position of the imaging device $10b$, wherein these two positions are on the same horizontal line of the imaging device $10a$ and the imaging device $10b$. That is, the point S in each image is captured at a point Sa(x,y) in the reference image Ia and a point Sb(x,y) in the comparison image Ib. Here, the disparity value $\Delta$ is expressed as Equation (1) using Sa(x,y) in the coordinates of the imaging device $10a$ and Sb(X,y) in the coordinates of the imaging device $10b$.

$$\Delta = X - x \quad (1)$$

Here, as in the case of FIG. 1, the disparity value is written as $\Delta = \Delta a + \Delta b$, where $\Delta a$ is the distance between the point Sa(x,y) in the reference image Ia and the point of intersection of the normal extending from the imaging lens $11a$ to the imaging surface, and $\Delta b$ is the distance between the point Sb(X,y) in the comparison image Ib and the point of intersection of the normal extending from the imaging lens $11b$ to the imaging surface.

Distance Calculation

The distance Z from the imaging devices $10a$, $10b$ to the object E can be derived using the disparity value $\Delta$. Specifically, the distance Z is the distance from the plane including the focus position of the imaging lens $11a$ and the focus position of the imaging lens $11b$ to a particular point S on the object E. As illustrated in FIG. 1, the distance Z can be calculated by Equation (2) using the focal length f of the imaging lens $11a$ and the imaging lens $11b$, the base line length B that is the length between the imaging lens $11a$ and the imaging lens $11b$, and the disparity value $\Delta$.

$$Z = (B \times f) / \Delta \quad (2)$$

From Equation (2), the greater the disparity value $\Delta$ is, the smaller the distance Z is, and the smaller the disparity value $\Delta$ is, the greater the distance Z is.

SGM Method

Referring now to FIG. 2 to FIG. 6, a distance measurement method using the SGM method will be described. FIG. 2(a) is a conceptual diagram illustrating a reference image, FIG. 2(b) is a conceptual diagram illustrating a high density disparity image for FIG. 2(a), and FIG. 2(c) is a conceptual diagram illustrating an edge disparity image for FIG. 2(a). Here, the reference image is an image representing an object by luminance. The high density disparity image is an image that is derived from the reference image by the SGM method and represents the disparity value at each set of coordinates in the reference image. The edge disparity image is an image that is derived by the conventionally used block matching method and represents the disparity values only at a part with relatively strong texture such as an edge in the reference image.

The SGM method is a method of deriving the disparity values appropriately even for an object with weak texture and deriving the high density disparity image illustrated in FIG. 2(b) based on the reference image illustrated in FIG. 2(a). When the block matching method is used, the edge disparity image illustrated in FIG. 2(c) is derived based on the reference image illustrated in FIG. 2(a). As can be understood by comparing the ovals enclosed by the broken lines in FIG. 2(b) and FIG. 2(c), compared with the edge disparity image, the high density disparity image can represent detailed information such as a road with weak texture and therefore enables distance measurement in more detail.

In the SGM method, a disparity value is derived by calculating a cost and thereafter further calculating a synthesized cost that is synthesized dissimilarity, rather than deriving a disparity value immediately after calculating a cost that is dissimilarity. In this method, a disparity image (here, high density disparity image) representing disparity values in almost all the pixels is finally derived. The block matching method is the same as the SGM method in that a cost is calculated. However, unlike the SGM method, the disparity values only at a part with relatively strong texture such as an edge are derived without synthesized costs being calculated.

Calculation of Cost

Figure 3:
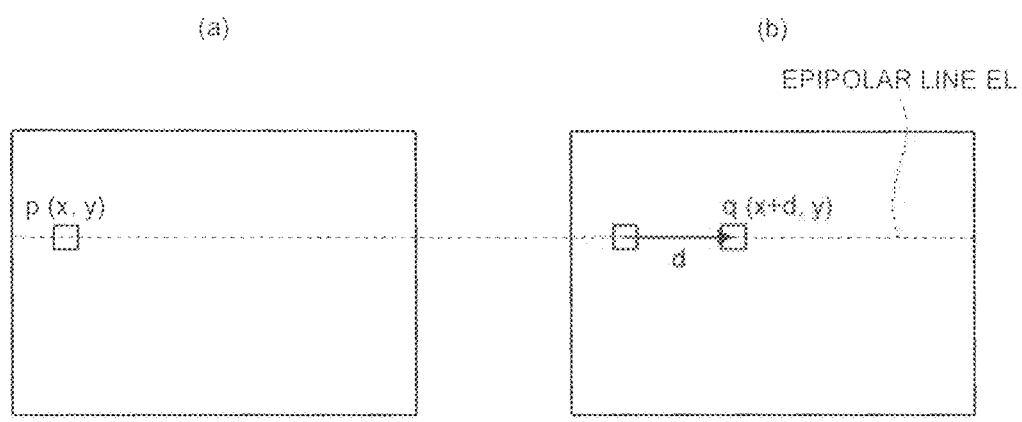
FIG. 3 illustrates a calculation of a shift amount while successively shifting candidates for a corresponding pixel in a comparison image relative to a reference image.
Figure 4:
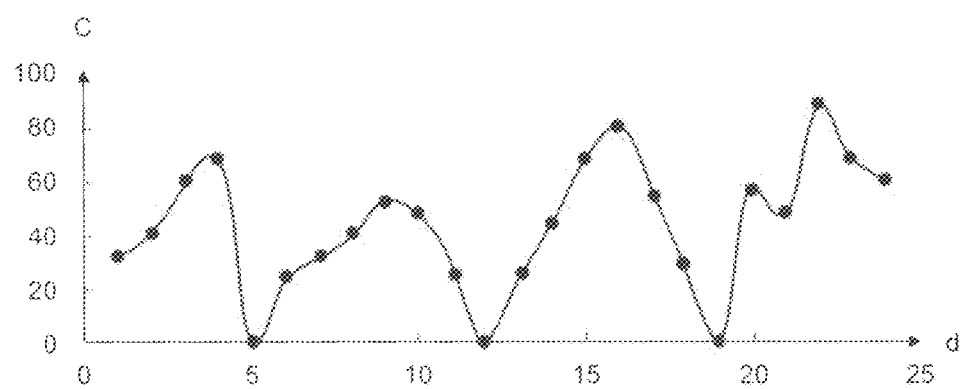
FIG. 4 is a graph illustrating costs with respect to shift amounts.

Referring first to FIG. 3 and FIG. 4, a method of calculating a cost $C(p,d)$ will be described. FIG. 3(a) is a conceptual diagram illustrating a reference pixel in a reference image and FIG. 3(b) is a conceptual diagram of calculating costs while successively shifting (displacing) candidates for the corresponding pixel in a comparison image relative to the reference pixel in (a). FIG. 4 is a graph illustrating costs with respect to shift amounts. Here, the corresponding pixel is a pixel in the comparison image that is the most similar to the reference pixel in the reference image. In the following description, it is assumed that $C(p,d)$ represents $C(x,y,d)$.

As illustrated in FIG. 3(a), the cost $C(p,d)$ of each candidate corresponding pixel $q(x+d,y)$ that corresponds to the reference pixel $p(x,y)$ is calculated based on the luminance values of a predetermined reference pixel $p(x,y)$ in the reference image and of a plurality of candidate corresponding pixels $q(x+d,y)$ on the epipolar line EL in the comparison image that corresponds to the reference pixel $p(x,y)$. The variable d is a shift amount (displacement amount) of each candidate q for the corresponding pixel from the reference pixel p, and a shift amount is expressed in units of pixels in the present embodiments. That is, in FIG. 3, the cost $C(p,d)$ that is dissimilarity in luminance value between a candidate corresponding pixel $q(x+d,y)$ and the reference pixel $p(x,y)$ is calculated while successively shifting the candidate corresponding pixels $q(x+d,y)$ one pixel by one pixel in a predetermined range (for example, $0<d<25$). A known method such as SAD (Sum of Absolute Difference) is applied as the method of calculating the cost C where the cost C denotes dissimilarity.

As illustrated in FIG. 4, the cost $C(p,d)$ thus calculated can be expressed by a graph of a cost curve that is a set of the costs C with respect to shift amounts d. In FIG. 4, since the cost C is zero when the shift amount $d=5, 12, 19$, the minimum value cannot be obtained. In the case of an object with weak texture, it is thus difficult to obtain the minimum value of the cost C.

Calculation of Synthesized Cost

Figure 5:
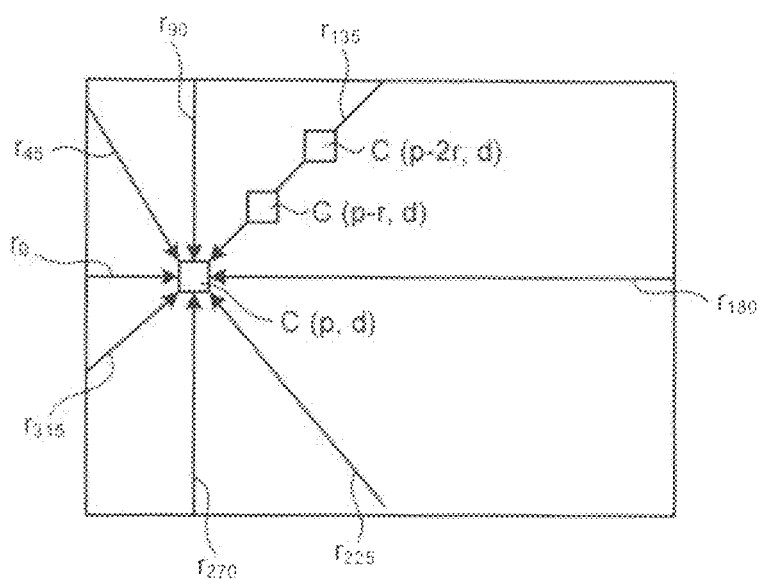
FIG. 5 is a conceptual diagram for deriving a synthesized cost.
Figure 6:
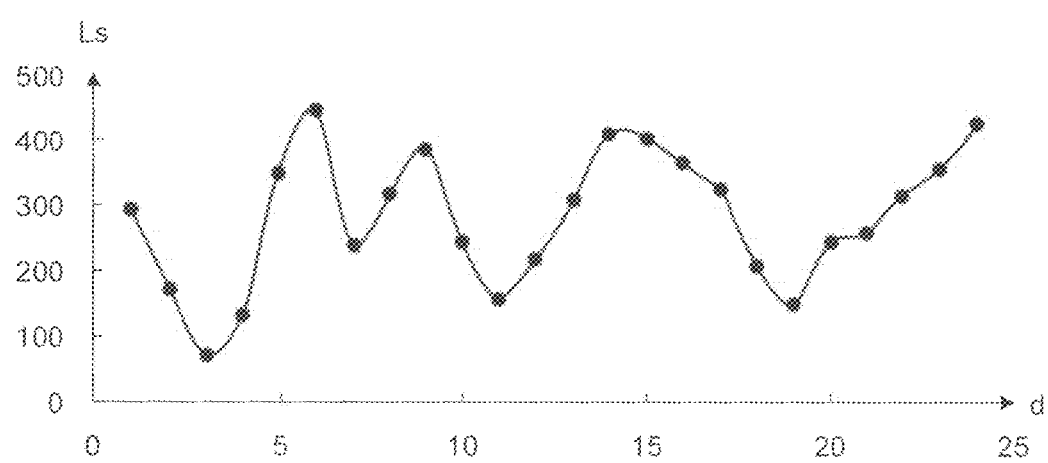
FIG. 6 is a graph illustrating synthesized costs with respect to disparity values.

Referring now to FIG. 5 and FIG. 6, the method of calculating a synthesized cost $Ls(p,d)$ will be described. FIG. 5 is a conceptual diagram for deriving a synthesized cost. FIG. 6 is a graph of a synthesized-cost curve illustrating synthesized costs with respect to disparity values.

In the method of calculating a synthesized cost in the present embodiments, the cost $C(p,d)$ in the reference pixel $p(x,y)$ is calculated, and costs for each one of pixels $p(x_n,y_n)$ existing near to far positions from the reference pixel $p(x,y)$ is also calculated as costs C for each one of another reference pixels $p(x_n,y_n)$. With this configuration, the synthesized cost $Ls(p,d)$ for the reference pixel $p(x,y)$ is calculated by aggregating the calculated cost $C(p,d)$ for the reference pixel $p(x,y)$ and the calculated costs C for other reference pixels $p(x_n,y_n)$ existing near to far positions from the reference pixel $p(x,y)$. Similarly, the synthesized cost Ls for each one of reference pixels $p(x_n,y_n)$ is calculated by aggregating the calculated cost C for one reference pixel $p(x_n,y_n)$ and the calculated costs C for other reference pixels existing near to far positions from the reference pixel $p(x_n,y_n)$.

The method of calculating a synthesized cost will now be described in more detail. In order to calculate the synthesized cost $Ls(p,d)$, first, it is necessary to calculate a path cost $Lr(p,d)$. Equation (3) is an equation for calculating the path cost $Lr(p,d)$, and Equation (4) is an equation for calculating the synthesized cost Ls.

$$Lr(p,d)=C(p,d)+\min\{(Lr(p-r,d),Lr(p-r,d-1)+P1,Lr(p-r,d+1)+P1,Lr\min(p-r)+p2\} \quad (3)$$

Here, in Equation (3), r denotes a direction vector in the aggregation direction and has two components of the x direction and the y direction. The term $\min\{\ \}$ is a function for obtaining the minimum value. $Lr\min(p-r)$ denotes the minimum value of $Lr(p-r,d)$ when the shift amount d is changed in the coordinates in which p is shifted by one pixel in r direction. The path cost Lr is recurrently applied as expressed in Equation (3). P1 and P2 are fixed parameters set by experiment in advance such that the disparity values Δ of adjacent reference pixels on the path are likely to be continuous. For example, $P1=48$, $P2=96$. As expressed in Equation (3), the path cost $Lr(p,d)$ is obtained by adding the minimum value of the path cost Lr of each pixel in the pixels in r direction illustrated in FIG. 5 to the cost C in the reference pixel $p(x,y)$. As described above, in order to obtain Lr at each pixel in r direction, Lr is obtained first from the endmost pixel in r direction of the reference pixel $p(x,y)$, and Lr is obtained along r direction. As illustrated in FIG. 5, $Lr_0$, $Lr_{45}$, $Lr_{90}$, $Lr_{135}$, $Lr_{180}$, $Lr_{225}$, $Lr_{270}$, $Lr_{315}$ in eight directions are obtained, and the synthesized cost Ls is eventually obtained based on Equation (4).

$$Ls(p, d) = \sum_8 Lr \quad (4)$$

The synthesized cost Ls(p,d) thus calculated can be represented by a graph of a synthesized-cost curve representing the synthesized cost Ls(p,d) with respect to the shift amount d, as illustrated in FIG. 6. In FIG. 6, the synthesized cost Ls has the minimum value when the shift amount d=3 and therefore is calculated as the disparity value Δ=3. Although the number of r is eight in the foregoing description, the number is not limited thereto. For example, the eight directions may be further divided by two into 16 directions or by three into 24 directions. Although being expressed as "dissimilarity", the cost C may be expressed as "similarity" that is a reciprocal of dissimilarity. In this case, a known method such as NCC (Normalized Cross Correlation) is applied as the method of calculating the cost C. In this case, the disparity value Δ not with the minimum but with the "maximum" synthesized cost Ls is derived. The similarity and the dissimilarity may be inclusively denoted as "matching degree".

SPECIFIC DESCRIPTION OF PRESENT EMBODIMENTS

Specific descriptions of the present embodiments are given below with reference to the drawings. Here, an object recognition system 1 mounted on an automobile will be described. The object recognition system 1 may be mountable not only on an automobile as an example of a vehicle but also on a motor bicycle, a bicycle, a wheelchair, and an agricultural cultivator as other examples of a vehicle. The object recognition system 1 may be mountable not only on a vehicle as an example of a movable apparatus but also on a robot as another example of a movable apparatus. The robot may not be a movable apparatus but may be an apparatus such as an industrial robot fixedly installed in FA (Factory Automation). The apparatus fixedly installed may not be a robot but may be a security monitoring camera.

Configuration of Embodiment

First, the overall configuration of each of the present embodiments will be described with reference to FIG. 7 to FIG. 9.

External Configuration

Figure 8:
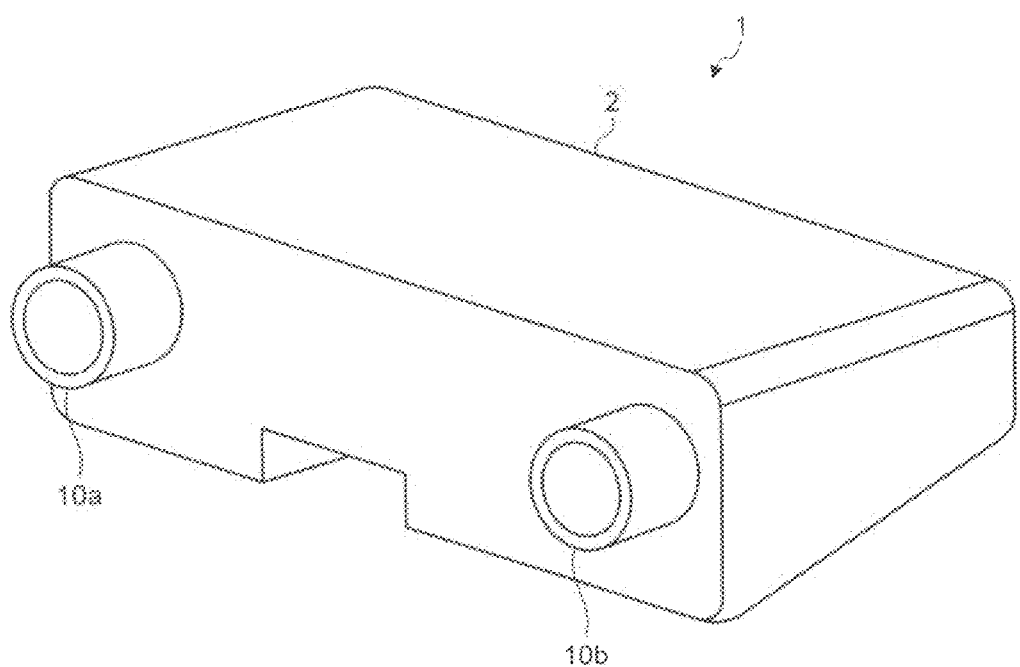
FIG. 8 is a schematic diagram of the object recognition system.

With reference to FIG. 7 and FIG. 8, an external configuration of the object recognition system 1 in the present embodiments will be described. FIG. 7(a) is a schematic diagram depicting a side of an automobile equipped with the object recognition system according to an embodiment of the present invention and FIG. 7(b) is a schematic diagram depicting the front of the automobile. FIG. 8 is a schematic diagram of the object recognition system.

As illustrated in FIGS. 7(a) and 7(b), the object recognition system 1 in the present embodiments includes an imaging device 10a (first imaging unit) and an imaging device 10b (second imaging unit). The imaging device 10a and the imaging device 10b are installed (first imaging position, second imaging position) so as to be able to image the scene ahead in the direction in which the automobile travels. As illustrated in FIG. 8, the object recognition system 1 includes a main body 2 and a pair of cylindrical imaging device 10a and imaging device 10b provided on the main body 2.

Overall Hardware Configuration

Figure 9:
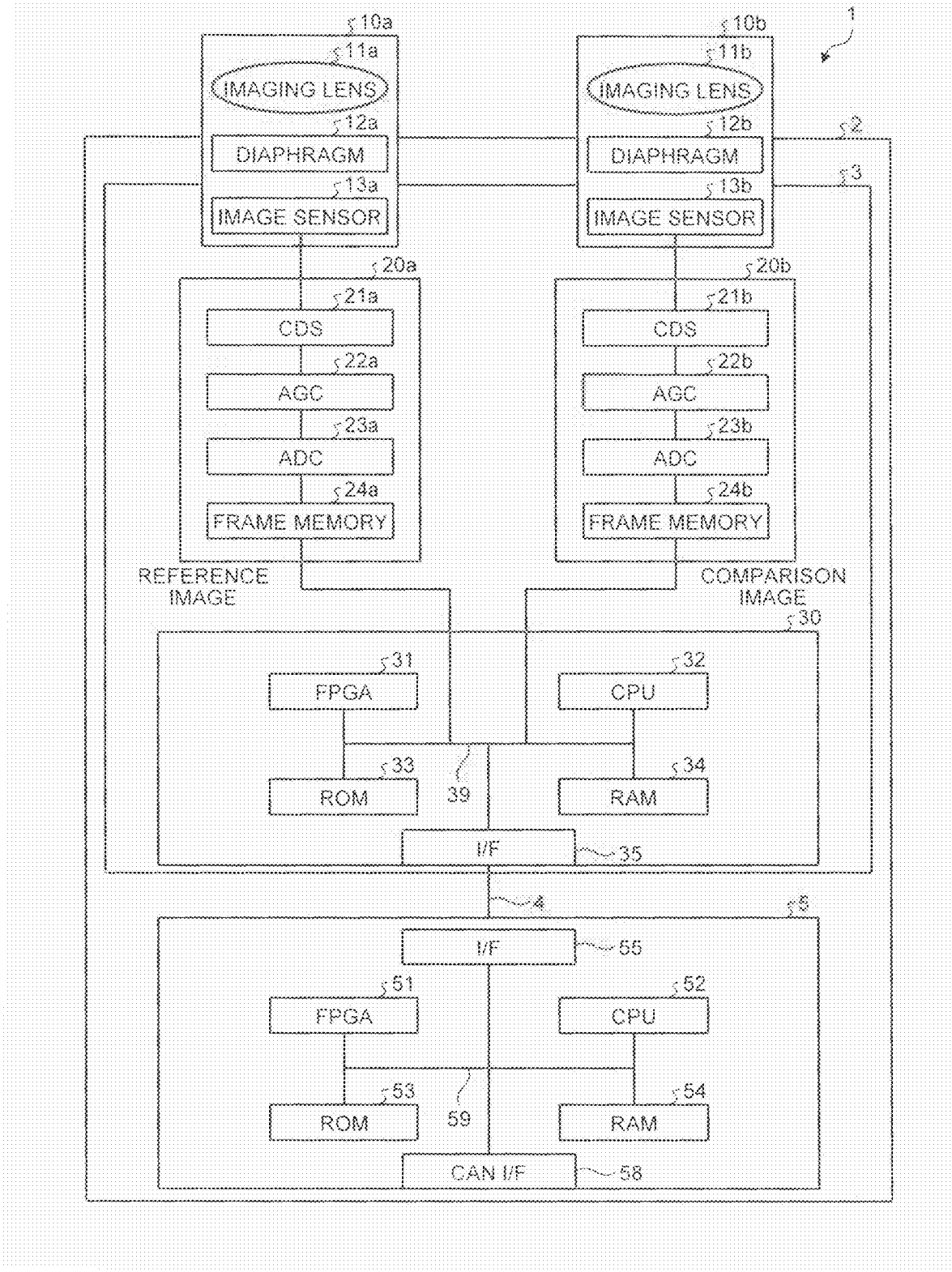
FIG. 9 is an overall hardware configuration diagram of the object recognition system.

Referring now to FIG. 9, an overall hardware configuration of the object recognition system 1 will be described. FIG. 9 is a hardware configuration diagram of the object recognition system as a whole.

As illustrated in FIG. 9, the object recognition system 1 includes a disparity value deriving device 3 and an object recognition device 5 in the main body 2.

The disparity value deriving device 3 derives a disparity value Δ indicating disparity for an object E from a plurality of images obtained by imaging the object E and outputs a high density disparity image indicating the disparity value Δ in each pixel. The object recognition device 5 performs processing such as measuring the distance from the imaging devices 10a, 10b to the object E, based on the high density disparity image output from the disparity value deriving device 3.

Here, a hardware configuration of the disparity value deriving device 3 will be described first. As illustrated in FIG. 9, the disparity value deriving device 3 includes the imaging device 10a, the imaging device 10b, a signal conversion device 20a, a signal conversion device 20b, and an image processing device 30.

The imaging device 10a generates an analog signal representing an image by imaging the scene ahead and includes an imaging lens 11a, a diaphragm 12a, and an image sensor 13a.

The imaging lens 11a is an optical element for diffracting light passing through the imaging lens 11a to form an image of an object. The diaphragm 12a cuts off part of light passing through the imaging lens 11a to adjust the quantity of light input to the image sensor 13a described later. The image sensor 13a is a semiconductor device that converts light input from the imaging lens 11a and the diaphragm 12a into an electrical analog image signal and is implemented, for example, by a charge coupled device (CCD) or a complementary metal oxide semiconductor (CMOS). The imaging device 10b has the same configuration as the imaging device 10a, and a description of the imaging device 10b is omitted. The imaging lens 11a and the imaging lens 11b are installed such that their respective lens surfaces are on the same plane.

The signal conversion device 20a converts an analog signal representing the captured image into image data in digital format, and includes a correlated double sampling (CDS) 21a, an auto gain control (AGC) 22a, an analog digital converter (ADC) 23a, and a frame memory 24a.

The CDS 21a removes noise by correlated double sampling from the analog image signal converted by the image sensor 13a. The AGC 22a performs gain control of controlling the intensity of the analog image signal having noise removed by the CDS 21a. The ADC 23a converts the analog image signal gain-controlled by the AGC 22a into image data in digital format. The frame memory 24a stores the image data converted by the ADC 23a.

Similarly, the signal conversion device 20b obtains image data from the analog image signal converted by the imaging device 10b and includes a CDS 21b, an AGC 22b, an ADC 23b, and a frame memory 24b.

The CDS 21b, the AGC 22b, the ADC 23b, and the frame memory 24b have the same configuration as the CDS 21a, the AGC 22a, the ADC 23a, and the frame memory 24a, respectively, and a description thereof is omitted.

The image processing device 30 is a device for processing image data converted by the signal conversion device 20a and the signal conversion device 20b. The image processing device 30 includes a field programmable gate array (FPGA)

31, a central processing unit (CPU) 32, a read only memory (ROM) 33, a random access memory (RAM) 34, an interface (I/F) 35, and a bus line 39 such as an address bus and a data bus for electrically connecting the components 31 to 35 as illustrated in FIG. 9.

The FPGA 31 is an integrated circuit and performs the process of calculating a disparity value Δ in the image represented by image data in accordance with an instruction from the CPU 32. The CPU 32 controls each function in the disparity value deriving device 3. The ROM 33 stores an image processing program for the CPU 32 to execute to control each function in the disparity value deriving device 3. The RAM 34 is used as a work area for the CPU 32. The I/F 35 is an interface for communicating with the I/F 55 of the object recognition device 5 described later through the bus line 4 such as an address bus and a data bus.

A hardware configuration of the object recognition device 5 will now be described. As illustrated in FIG. 9, the object recognition device 5 includes an FPGA 51, a CPU 52, a ROM 53, a RAM 54, an I/F 55, a controller area network (CAN) I/F 58, and a bus line 59 such as an address bus and a data bus for electrically connecting the components 51 to 55, 58 as illustrated in FIG. 9.

The FPGA 51, the CPU 52, the ROM 53, the RAM 54, the I/F 55, and the bus line 59 have the same configuration as the FPGA 31, the CPU 32, the ROM 33, the RAM 34, the I/F 35, and the bus line 39, respectively, in the image processing device 30 and a description thereof is omitted. The I/F 55 is an interface for communicating with the I/F 35 in the image processing device 30 through the bus line 4. The ROM 53 stores an object recognition program for the CPU 52 to execute to control each function in the object recognition device 5. The CAN I/F 58 is an interface for communicating with, for example, an external controller and can be connected to, for example, a controller area network (CAN) of the automobile.

In such a configuration, when a high density disparity image is transmitted from the I/F 35 of the image processing device 30 to the object recognition device 5 through the bus line 4, the FPGA 51 calculates the distance Z from the imaging devices 10a, 10b to an object E according to an instruction from the CPU 52 in the object recognition device 5.

The FPGA 31 may calculate the distance Z under an instruction from the CPU 32 of the image processing device 30, rather than the FPGA 51 calculating the distance Z under an instruction from the CPU 52 in the object recognition device 5.

The programs described above may be recorded in an installable or executable file format on a computer-readable storage medium to be distributed. Examples of the storage medium include a compact disc read only memory (CD-ROM) and a secure digital (SD) memory card.

Figure 10:
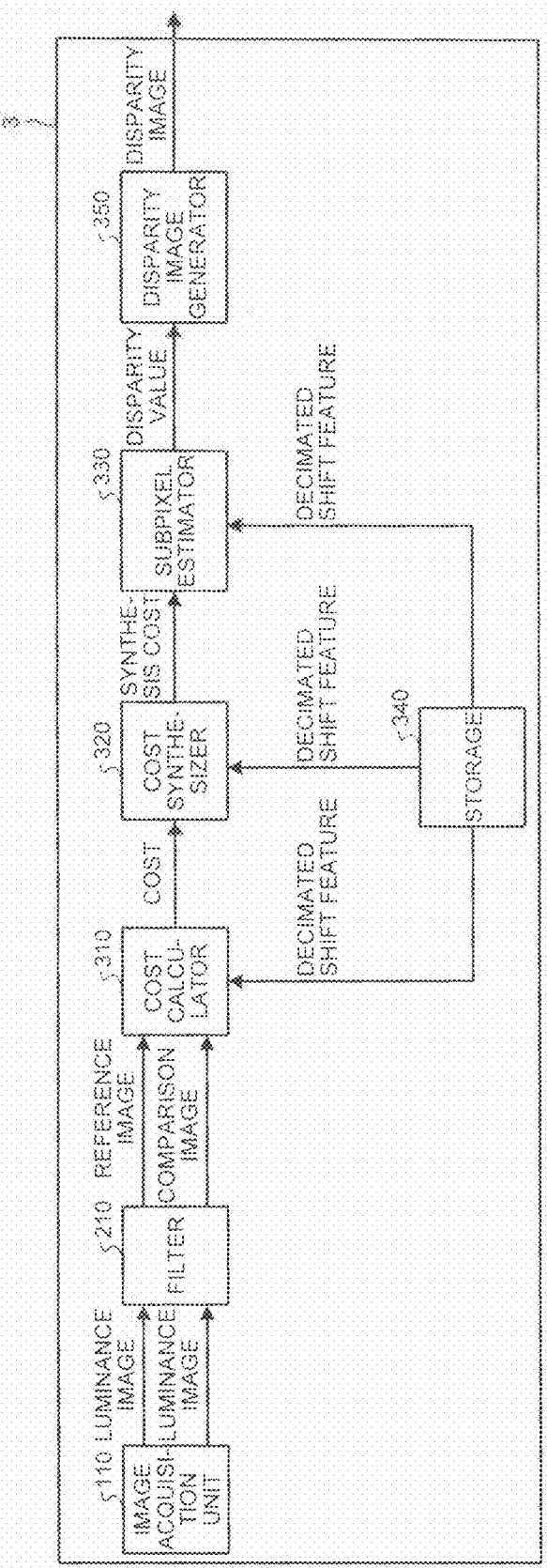
FIG. 10 is a diagram illustrating an example of the block configuration of the disparity value deriving device according to the present embodiment.
Figure 11:
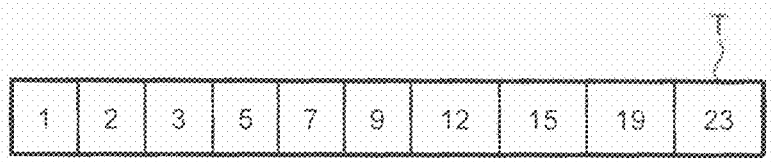
FIG. 11 is a diagram illustrating an example of a feature table depicting decimated shift features.
Figure 12:
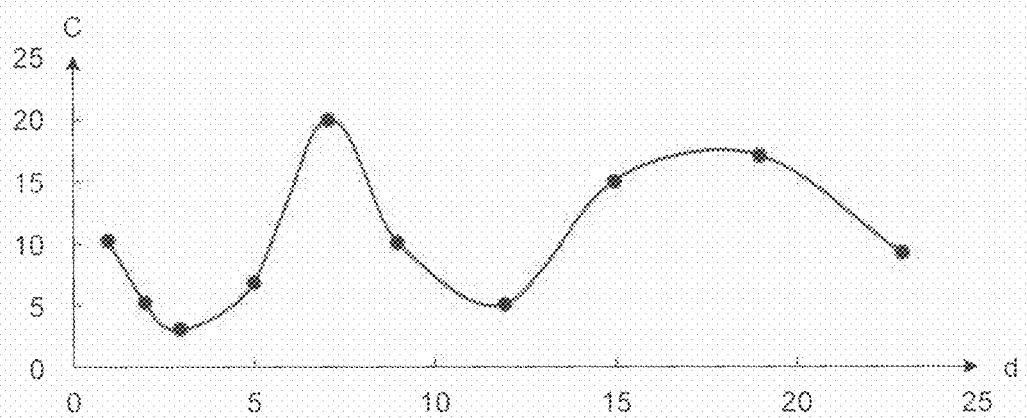
FIG. 12 is a graph illustrating the relation between the shift amount of the decimated shift features and the cost.
Figure 13:
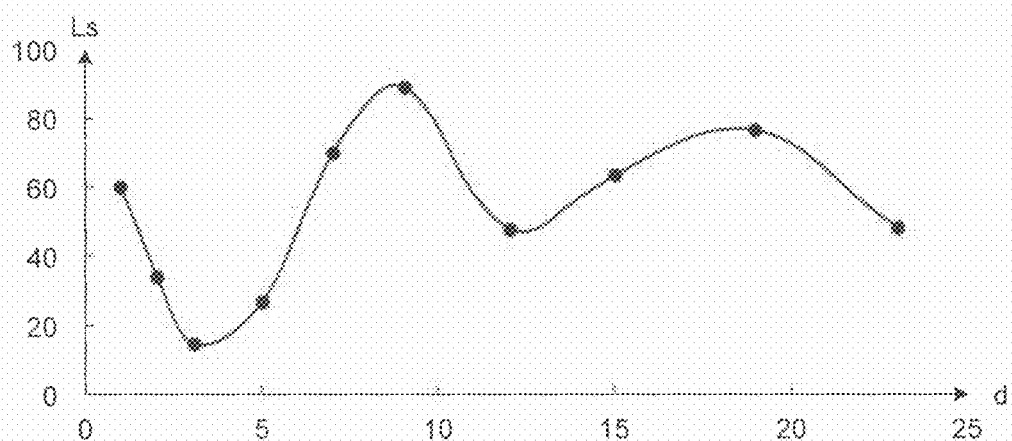
FIG. 13 is a graph illustrating the relation between the shift amount of the decimated shift features and the synthesis cost.
Figure 14:
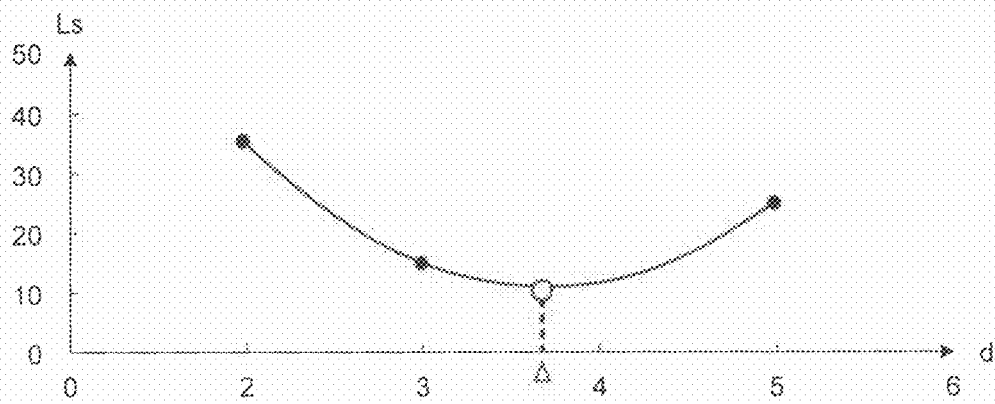
FIG. 14 is a diagram illustrating subpixel estimation by parabola fitting.
Figure 15:
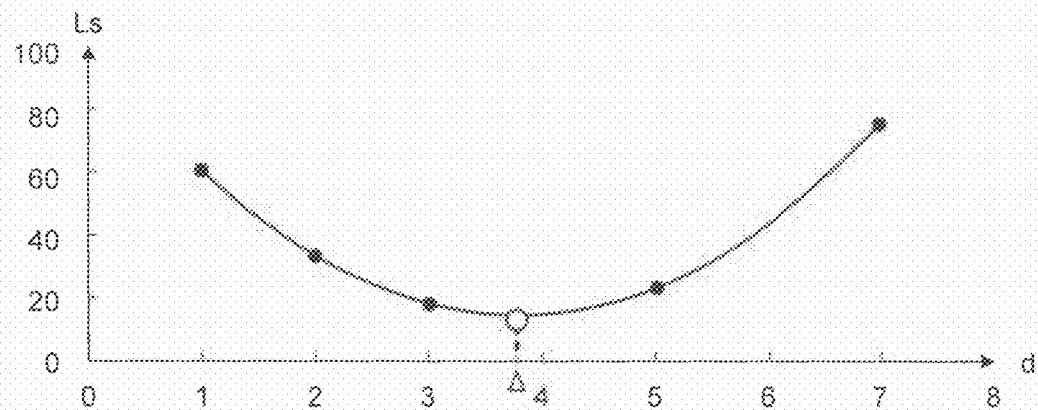
FIG. 15 is a diagram illustrating subpixel estimation by the least-squares method.
Figure 16:
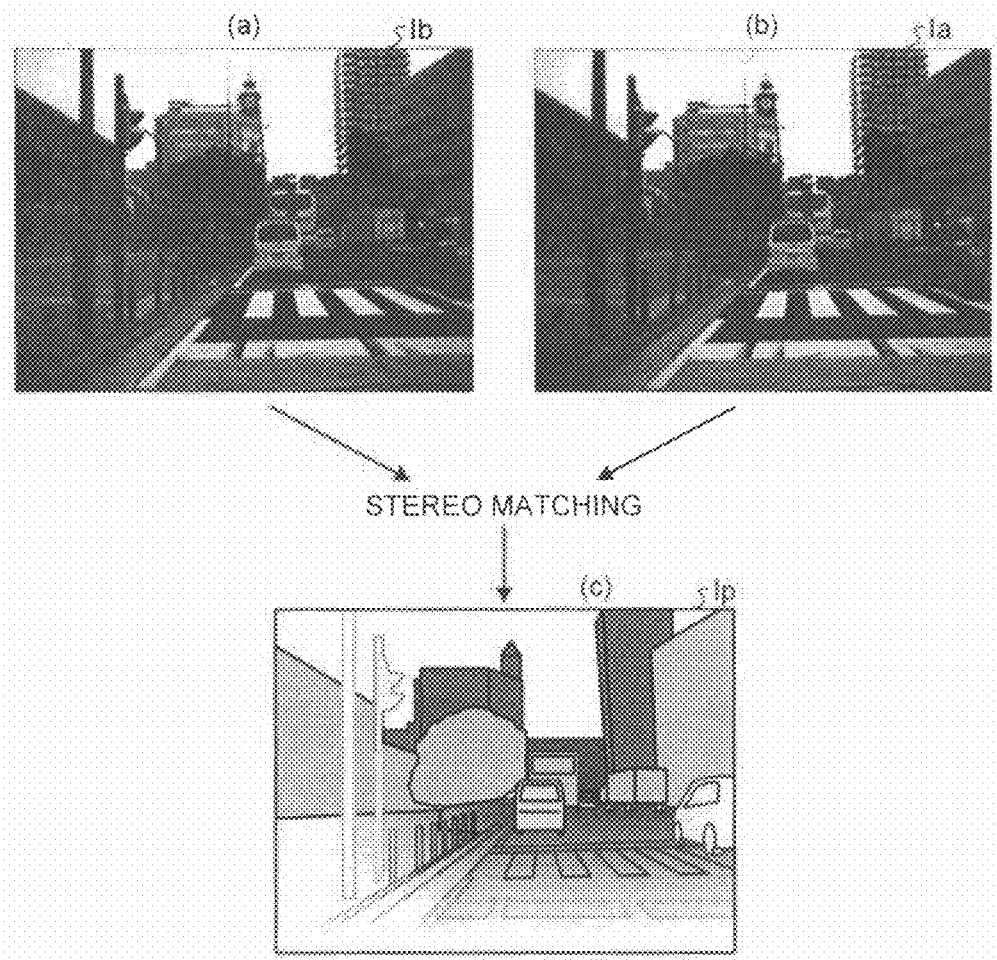
FIG. 16 is a conceptual diagram illustrating a high density disparity image using the subpixel estimation.

Block Configuration of Disparity Value Deriving Device and Operation of Each Block FIG. 10 is a diagram illustrating an example of the block configuration of the disparity value deriving device according to the present embodiment. FIG. 11 is a diagram illustrating an example of a feature table depicting decimated shift features. FIG. 12 is a graph illustrating the relation between the shift amounts of a decimated shift feature and the costs. FIG. 13 is a graph illustrating the relation between the shift amounts of decimated shift features and the synthesis costs. FIG. 14 is a diagram illustrating subpixel estimation by parabola fitting. FIG. 15 is a diagram illustrating subpixel estimation by the least-squares method. FIG. 16 is a conceptual diagram illustrating a high density disparity image using the subpixel estimation. Referring to FIG. 10 to FIG. 16, a block configuration of the principal part of the disparity value deriving device 3 and the operation of each block will be described. The imaging device 10a illustrated in FIG. 8 is referred to as the "right camera" and the imaging device 10b is referred to as the "left camera" for convenience of explanation.

As illustrated in FIG. 10, the disparity value deriving device 3 includes an image acquisition unit 110, a filter 210, a cost calculator 310 (acquisition unit), a cost synthesizer 320 (synthesizer), a subpixel estimator 330 (deriving unit), a storage 340 (storage), and a disparity image generator 350.

The image acquisition unit 110 is a processing unit that images an object ahead with the two, left and right cameras and generates analog image signals to obtain two luminance images that are images based on the respective image signals. The image acquisition unit 110 is implemented by the imaging device 10a and the imaging device 10b illustrated in FIG. 9.

The filter 210 removes noise from the image signals of the two luminance images obtained by the image acquisition unit 110, converts the image signals into digital image data, and outputs the converted digital image data. Here, the image data of the two luminance images (hereinafter simply referred to as "luminance images") output by the filter 210 are set as the image data of the reference image Ia (hereinafter simply referred to as "reference image Ia") captured by the right camera (imaging device 10a) of the image acquisition unit 110 and as the image data of the comparison image Ib (hereinafter simply referred to as "comparison image Ib") captured by the left camera (imaging device 10b). That is, the filter 210 outputs the reference image Ia and the comparison image Ib based on the two luminance images output from the image acquisition unit 110. The filter 210 is implemented by the signal converters 20a, 20b illustrated in FIG. 9.

The storage 340 stores a feature table T illustrated in FIG. 11, which provides discrete shift amounts d used when the cost calculator 310 calculates the cost C(p,d) of the candidate corresponding pixel q(x+d,y) that corresponds to the reference pixel p(x,y) in the comparison image Ib. Here, the cost refers to an evaluation value representing the degree of dissimilarity of each pixel in the comparison image Ib relative to the reference pixel p in the reference image Ia. That is, the smaller value of the cost (and synthesis cost) illustrated below indicates that the pixel in the comparison image is more similar to the reference pixel. The storage 340 is implemented by the ROM 33 or the RAM 34 illustrated in FIG. 9. Here, discrete values of the shift amounts d that are included in the feature table T are referred to as decimated shift features (features). Specifically, the decimated shift features include the discrete shift amounts d obtained by partially removing some values (decimating) by a predetermined method from a predetermined range of shift amounts d (for example, 0<d<25), of the shift amounts d used for obtaining the costs C of the candidate pixels q(x+d,y) in the comparison image Ib. That is, the decimated shift features include discontinuous shift amounts d in a predetermined range of shift amounts.

The cost calculator 310 calculates and obtains the cost C(p,d) of each candidate pixel q(x+d,y), based on the luminance value of the reference pixel p(x,y) in the reference image Ia and the luminance value of each of the candidate pixels q(x+d,y) (candidate regions) for the corresponding pixel that are specified by being shifted by shift amounts d from the pixel corresponding to the position of the reference pixel p(x,y) on the Epipolar line in the comparison image Ib based on the reference pixel p(x,y). Here, the cost calculator 310 calculates the costs C(p,d) by using, as the shift amounts d for use in calculating the costs C(p,d) of the candidate pixels q(x+d,y) in the comparison image Ib, the shift amounts d included in the decimated shift features. That is, the cost calculator 310 does not calculate the costs C based on the shift amounts d shifted in units of pixels but calculates the costs C(p,d) based on the discrete shift amounts d included in the decimated shift features. As a result, regions of the respective candidate pixels q(x+d,y) in the designated range for which the costs C are calculated include those displaced two or more pixels in the closest ones in the shifting direction. The cost calculator 310 is implemented by the FPGA 31 illustrated in FIG. 9. The cost C calculated by the cost calculator 310 is, for example, the sum of absolute differences (SAD) or the sum of squared differences (SSD). The graph in FIG. 12 illustrates the relation between the discrete shift amounts d included in the decimated shift features and the costs C calculated by the cost calculator 310. As described above, the cost calculator 310 calculates the costs C based on not the shift amounts d shifted in units of pixels but the discrete shift amounts d included in the decimated shift features, thereby reducing the processing load for calculating the costs C.

Here, an example of the predetermined method for obtaining the decimated shift features will be described. First, it can be understood from Equation (2) above that, in the comparison image Ib and the reference image Ia, the distance Z to the object with a small disparity value Δ is large, and the distance Z to an object with a large disparity value Δ is small. Therefore, in the comparison image Ib and the reference image Ia, a change of the distance Z corresponding to a unit change of the disparity value Δ in a region where the disparity value Δ is small (a region where the distance Z is large) is greater than a change of the distance Z corresponding to the unit change of the disparity value Δ in a region where the disparity value Δ is large (a region where the distance Z is small). For example, it is assumed that, in Equation (2) above, the value of B×f defined by the specifications of the disparity value deriving device 3 is B×f=30. Here, for example, if the disparity value Δ changes by a unit amount from "2" to "3" in a region where the disparity value Δ is small, the distance Z changes from "15" to "10" and the amount of change of the distance Z in this case is "−5". On the other hand, if the disparity value Δ changes by the unit amount from "10" to "11" in a region where the disparity value Δ is large, the distance Z changes from "3" to "2.7" and the amount of change of the distance Z in this case is "−0.3", which is smaller than the amount of change of the distance Z in a region where the disparity value Δ is small.

The minimum necessary distance information that satisfies the driving assistance in the vehicle 100 traveling on the road should have a required resolution. For example, the range of distance obtained as distance information is 1 to 100 [m] and the required resolution is 1 [m]. In this case, in a region where the shift amount d is smaller, a change of the distance Z corresponding to a change of the shift amount d is greater. Therefore, in order to derive a disparity value Δ that satisfies the resolution of the distance Z, the cost calculator 310 need to calculate the cost C for each of shift amounts d at fine intervals. On the other hand, in a region where the shift amount d is larger, a change of the distance Z corresponding to a change of the shift amount d is smaller. Therefore, in order to derive a disparity value Δ that satisfies the resolution of the distance Z, the cost calculator 310 may calculate the cost C for each of shift amounts d at coarse intervals. Hence, when the decimated shift features are obtained based on the required resolution in terms of distance, the interval between the discrete shift amounts d is reduced (fine) in a region where the values of the shift amounts d included in the decimated shift features are small, whereas the interval between the shift discrete amounts d is increased (coarse) in a region where the values of the shift amounts d are large. That is, when the shift amounts d included in the decimated shift features are arranged in ascending order, the difference in value between the adjacent shift amounts d increases as the value of the shift amount d increases. The decimated shift features thus obtained are stored in advance in the form of the feature table T in the storage 340.

For example, when the predetermined range of shift amounts d is 0<d<25 as described above, an example of the decimated shift features obtained by the method described above is illustrated as the decimated shift features in the feature table T in FIG. 11. The shift amounts d "1, 2, 3, 5, 7, 9, 12, 15, 19, 23" form the decimated shift features in the feature table T in FIG. 11. The intervals between the values of the shift amounts d included in the decimated shift features illustrated in FIG. 11 are "1, 1, 2, 2, 2, 3, 3, 4, 4", in which the interval between the shift amounts d is small in a region where the values of the shift amounts d are small, whereas the interval between the shift amounts d is larger in a region where the values of the shift amounts d are large. In the following description, it is assumed that the shift amounts d "1, 2, 3, 5, 7, 9, 12, 15, 19, 23" form the respective decimated shift features in the feature table T as illustrated in FIG. 11. Obviously, other values of the shift amounts d may form the decimated shift features.

As described above, in the graph in FIG. 12 illustrating the relation between the shift amounts d included in the decimated shift features illustrated in FIG. 11 and the costs C calculated by the cost calculator 310, approximations of the minimum value of the costs C are given when the shift amount d=3 and d=12. It is therefore difficult to obtain the minimum value of the costs C to obtain the corresponding pixel in the comparison image Ib corresponding to the reference pixel in the reference image Ia. Particularly when an image includes a portion with weak texture, it is thus difficult to obtain the minimum value of the costs C.

The cost synthesizer 320 calculates the synthesis cost Ls(p,d) of the candidate pixel q(x+d,y) by aggregating the costs C of the pixels in the comparison image Ib for reference pixels (second reference region) that are pixels in the neighborhood of the reference pixel p(x,y) (first reference region) in the reference image Ia, with the cost C(p,d) of the candidate pixel q(x+d,y) calculated by the cost calculator 310. Here, the cost synthesizer 320 calculates the synthesis costs Ls(p,d), using the shift amounts d included in the decimated shift features as the shift amounts d for use in calculating the synthesis costs Ls(p,d). That is, the cost synthesizer 320 does not calculate the synthesis costs Ls based on the shift amounts d shifted in units of pixels but calculates the synthesis costs Ls(p,d) based on the discrete shift amounts d included in the decimated shift features. As a result, regions of the respective candidate pixels q(x+d,y) in a designated range for which the synthesis costs Ls are calculated include those displaced two or more pixels in the closest ones in the shifting direction. The cost synthesizer 320 is implemented by the FPGA 31 illustrated in FIG. 9. In order to calculate the synthesis cost Ls, first, the cost synthesizer 320 calculates the path cost Lr(p,d) in a predetermined direction of r by (Equation 3) above. In this case, Lr(p−r,d) in (Equation 3) represents the path costs Lr when the pixel at the coordinates one pixel shifted in the direction of r from the coordinates of the reference pixel p is shifted by the shift amounts d included in the decimated shift features. Next, the cost synthesizer 320 calculates the path costs Lr in eight directions, that is, $Lr_0$, $Lr_{45}$, $Lr_{90}$, $Lr_{135}$, $Lr_{180}$, $Lr_{225}$, $Lr_{270}$, and $Lr_{315}$ as illustrated in FIG. 5 and finally calculates the synthesis cost Ls(p,d) based on (Equation 4) above. The graph in FIG. 13 represents the relation between the discrete shift amounts d included in the decimated shift features and the synthesis costs Ls calculated by the cost synthesizer 320. As illustrated in FIG. 13, the minimum value of the synthesis costs Ls is obtained when the shift amount d=3. As described above, the cost synthesizer 320 calculates the synthesis costs Ls based, not on the shift amounts d shifted in units of pixels, but on the discrete shift amounts d included in the decimated shift features, thereby reducing the processing load for calculating the synthesis costs Ls.

The subpixel estimator 330 executes subpixel estimation, based on the synthesis costs Ls calculated by the cost synthesizer 320 at the shift amount d corresponding to the minimum value (first extreme) of the synthesis costs Ls of pixels in the comparison image Ib for the reference pixel in the reference image Ia and at the adjacent shift amounts d. The subpixel estimator 330 is implemented by the FPGA 31 illustrated in FIG. 9. The graph of the synthesis costs Ls illustrated in FIG. 13 is the graph of the synthesis costs Ls with respect to the shift amounts d discretely selected but sectioned in units of pixels. It follows that the minimum value of the synthesis costs Ls in the graph in FIG. 13 is the synthesis cost Ls at d=3 of the shift amounts sectioned in units of pixels. That is, in the graph of the synthesis costs Ls with respect to the shift amounts d sectioned in units of pixels as illustrated in FIG. 13, only a value in units of pixels can be derived as a disparity value Δ. Here, subpixel estimation refers to estimating and deriving a disparity value Δ in units smaller than pixels (hereinafter referred to as units of subpixels), rather than a value in units of pixels.

Referring first to FIG. 14, a case in which the subpixel estimator 330 executes subpixel estimation by parabola fitting will be described. The subpixel estimator 330 obtains the value of the shift amount d that corresponds to the smallest synthesis cost Ls in the graph (FIG. 13) of the synthesis costs Ls calculated by the cost synthesizer 320. In the example in FIG. 13, the shift amount d=3 corresponds to the smallest synthesis cost Ls. Next, the subpixel estimator 330 obtains the shift amounts d adjacent to the shift amount d=3, in the decimated shift features. Specifically, the shift amount d=2, 5. Next, the subpixel estimator 330 obtains a quadratic curve convex downward that passes through three points at which the shift amount d=2, 3, 5, as illustrated in FIG. 14, in the graph of the shift amounts d and the synthesis costs Ls in FIG. 13. The subpixel estimator 330 then estimates that the shift amount d in units of subpixels corresponding to the local minimum value (second extreme) of the quadratic curve is the disparity value Δ.

Referring now to FIG. 15, a case where the subpixel estimator 330 executes subpixel estimation by the least-squares method will be described. The subpixel estimator 330 obtains the value of the shift amount d at which the synthesis cost Ls is the smallest in the graph (FIG. 13) of the synthesis costs Ls calculated by the cost synthesizer 320. In the example in FIG. 13, the shift amount d=3 corresponds to the smallest synthesis cost Ls. Next, the subpixel estimator 330 obtains four shift amounts d in the vicinity of the shift amount d=3 in the decimated shift features. Specifically, the shift amount d=1, 2, 5, 7. Next, the subpixel estimator 330 obtains a quadratic curve convex downward that passes through the vicinity of the five points at which the shift amount d=1, 2, 3, 5, 7 by the least squares method, as illustrated in FIG. 15, in the graph of the shift amounts d and the synthesis costs Ls in FIG. 13. The subpixel estimator 330 then estimates that the shift amount d in units of subpixels corresponding to the local minimum value (third extreme) of the quadratic curve is the disparity value Δ.

The subpixel estimator 330 estimates and derives the disparity value Δ by the subpixel estimation based on parabola fitting as illustrated in FIG. 14 or the subpixel estimation based on the least squares method as illustrated in FIG. 15. Since the disparity value Δ can be thus derived in units of subpixels, which are units smaller than pixels, accurate and high density disparity values Δ can be derived.

The subpixel estimation is not limited to estimation based on parabola fitting and estimation based on the least squares method but may be based on other methods. For example, the subpixel estimator 330 may execute subpixel estimation using the three points illustrated in FIG. 14, by equiangular linear fitting for estimating the disparity value Δ by obtaining equiangular lines passing through the three points, rather than a quadratic curve.

In the subpixel estimation based on the least squares method, a quadratic curve is obtained using five points on the graph in FIG. 15. However, embodiments are not limited thereto, and a quadratic curve may be obtained using a different number of points.

Embodiments are not limited to calculation of the disparity value Δ in units of subpixels through subpixel estimation by the subpixel estimator 330. The disparity value Δ in units of pixels may be calculated without executing the subpixel estimation. In this case, the subpixel estimator 330 outputs, as a disparity value Δ, the shift amount d corresponding to the minimum value of the synthesis costs Ls of pixels in the comparison image Ib for the reference pixel in the reference image Ia that are calculated by the cost synthesizer 320.

The disparity image generator 350 generates a disparity image Ip (high density disparity image), which is an image representing the luminance value of each pixel in the reference image Ia by the disparity value Δ corresponding to that pixel, based on the disparity value Δ in units of subpixels derived by the subpixel estimator 330. The disparity image generator 350 is implemented by the FPGA 31 illustrated in FIG. 9. FIG. 16A is a schematic diagram illustrating an example of the comparison image Ib, FIG. 16B is a schematic diagram illustrating an example of the reference image Ia, and FIG. 16C is a schematic diagram illustrating a conceptual diagram of the disparity image Ip generated by the disparity image generator 350.

The cost calculator 310, the cost synthesizer 320, the subpixel estimator 330, and the disparity image generator 350 are implemented by the FPGA 31, that is, hardware circuitry, although embodiments are not limited thereto. That is, at least one of the cost calculator 310, the cost synthesizer 320, the subpixel estimator 330, and the disparity image generator 350 may be implemented by the CPU 32 executing a software program. The cost calculator 310, the cost synthesizer 320, the subpixel estimator 330, and the disparity image generator 350 are functions conceptually configured as blocks, and embodiments are not limited to such a configuration.

Image Processing Operation of Disparity Value Deriving Device

Figure 17:
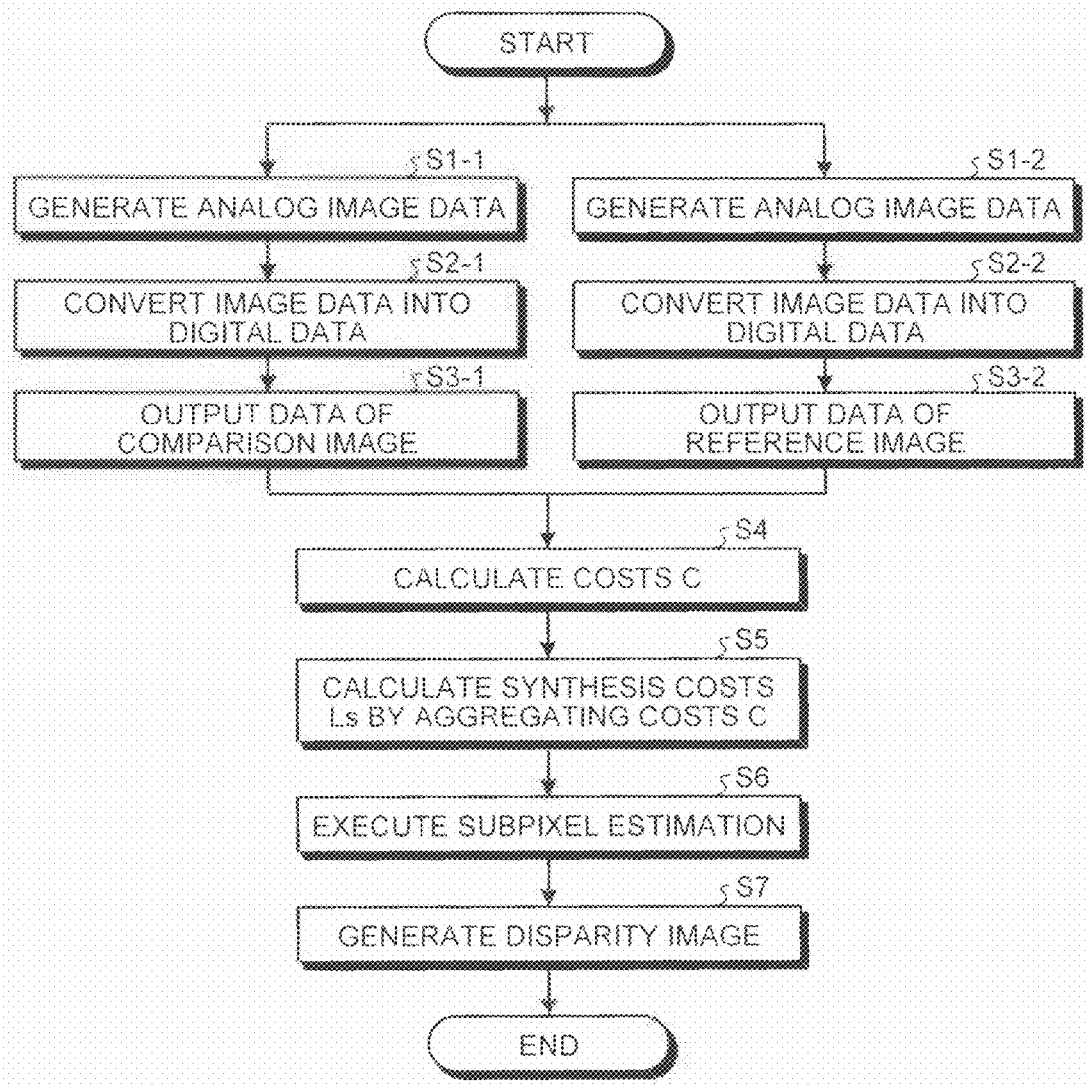
FIG. 17 is a diagram illustrating an example of the operation procedure of a stereo matching process of the disparity value deriving device according to the present embodiment.

FIG. 17 is a diagram illustrating an example of the operational procedure of a stereo matching process in the disparity value deriving device according to the present embodiment. Referring to FIG. 17, the operational procedure of image processing based on the stereo matching process (the SGM method) in the disparity value deriving device 3 will be described.

Step S1-1

The image acquisition unit 110 of the disparity value deriving device 3 generates an analog image signal by imaging an object ahead with the left camera (imaging device 10*b*) and obtains a luminance image that is an image based on the image signal. The process then proceeds to step S2-1.

Step S1-2

The image acquisition unit 110 of the disparity value deriving device 3 generates an analog image signal by imaging an object ahead with the right camera (imaging device 10*a*) and obtains a luminance image that is an image based on the image signal. The process then proceeds to step S2-2.

Step S2-1

The filter 210 of the disparity value deriving device 3 removes noise from the analog image signal obtained by imaging with the imaging device 10*b* and converts the image signal into digital image data. The process then proceeds to step S3-1.

Step S2-2

The filter 210 of the disparity value deriving device 3 removes noise from the analog image signal obtained by imaging with the imaging device 10*a* and converts the image signal into digital image data. The process then proceeds to step S3-2.

Step S3-1

The filter 210 outputs an image based on the digital image data converted at step S2-1 as a comparison image Ib in the stereo matching process. The process then proceeds to step S4.

Step S3-2

The filter 210 outputs an image based on the digital image data obtained by the conversion at step S2-2 as a reference image Ia in the stereo matching process. The process then proceeds to step S4.

Step S4

The cost calculator 310 of the disparity value deriving device 3 calculates and obtains the cost C(p,d) of each candidate pixel q(x+d,y), based on the luminance value of the reference pixel p(x,y) in the reference image Ia and the luminance value of each of the candidate pixels q(x+d,y) for the corresponding pixel that are specified by shifting positions by shift amounts d from the pixel corresponding to the position of the reference pixel p(x,y) on the Epipolar line in the comparison image Ib based on the reference pixel p(x,y). In doing so, the cost calculator 310 calculates the costs C(p,d) by using the shift amounts d included in the decimated shift features in the feature table T stored in the storage 340, as the shift amounts d used for calculating the costs C(p,d) of the candidate pixels q(x+d,y) in the comparison image Ib. The process then proceeds to step S5.

Step S5

The cost synthesizer 320 of the disparity value deriving device 3 calculates the synthesis cost Ls(p,d) of the candidate pixel q(x+d,y), by aggregating the costs C of pixels in the comparison image Ib for the reference pixels, which are pixels in the neighborhood of the reference pixel p(x,y) in the reference image Ia, with the cost C(p,d) of the candidate pixel q(x+d,y) calculated by the cost calculator 310. In doing so, the cost synthesizer 320 calculates the synthesis costs Ls(p,d) by using the shift amounts d included in the deci-mated shift features, as the shift amounts d used for calculating the synthesis costs Ls(p,d). The process then proceeds to step S6.

Step S6

The subpixel estimator 330 of the disparity value deriving device 3 executes subpixel estimation, based on the synthesis costs Ls, calculated by the cost synthesizer 320, at the shift amount d corresponding to the minimum value of the synthesis costs Ls of pixels in the comparison image Ib for the reference pixel in the reference image Ia and at the shift amounts d that are adjacent to the above shift amount d. The subpixel estimator 330 estimates that the shift amount d in units of subpixels corresponding to the local minimum value of the fitted curve (the quadratic curve convex downward in FIG. 14 and FIG. 15) obtained by subpixel estimation is the disparity value Δ. The process then proceeds to step S7.

Step S7

The disparity image generator 350 of the disparity value deriving device 3 generates the disparity image Ip (high density disparity image) that is an image representing the luminance value of each pixel in the reference image Ia by the disparity value Δ corresponding to that pixel, based on the disparity values Δ in units of subpixels derived by the subpixel estimator 330.

The image data of the disparity image Ip is then output through the I/F 35 in FIG. 9, and the distance from the imaging devices 10*a*, 10*b* to the object is calculated by the object recognition device 5.

Example of Equipment Control System Mounted on Vehicle

FIG. 18 is a diagram illustrating an example of an equipment control system according to the present embodiment mounted on a vehicle. Referring to FIG. 18, an example of the equipment control system 60 mounted on a vehicle 100 will be described below.

In the configuration illustrated in FIG. 18, the vehicle 100 configured as an automobile includes the equipment control system 60. The equipment control system 60 includes the disparity value deriving device 3 installed in the inside of the vehicle that is a cabin space, a control device 6, a steering wheel 7, and a brake pedal 8.

The disparity value deriving device 3 has an imaging function of imaging the direction in which the vehicle 100 travels, and is installed, for example, in the vicinity of the rear view mirror on the inside of the front window of the vehicle 100. The disparity value deriving device 3 includes a main body 2, and an imaging device 10*a* and an imaging device 10*b* fixed to the main body 2. The imaging devices 10*a*, 10*b* are fixed to the main body 2 such that an object in the direction in which the vehicle 100 travels can be imaged.

The control device 6 is a device connected to the disparity value deriving device 3 in place of the object recognition device 5 in the object recognition system 1 described above and executes a variety of vehicle control with distance information from the disparity value deriving device 3 to the object that is obtained based on image data of the disparity image received from the disparity value deriving device 3. The control device 6 executes, as an example of the vehicle control, steering control of controlling a steering system (control target) including the steering wheel 7 to avoid an obstacle, or brake control of controlling the brake pedal 8 (control target) to decelerate and stop the vehicle 100, based on image data of the disparity image received from the disparity value deriving device 3.

The safety of driving the vehicle 100 can be improved by executing vehicle control such as steering control or brake control as in the equipment control system 60 including the disparity value deriving device 3 and the control device 6.

As described above, the disparity value deriving device 3 captures an image of objects in front of the vehicle 100. However, embodiments are not limited thereto. Specifically, the disparity value deriving device 3 may be installed so as to capture an image of objects in the rear or at the side of the vehicle 100. In this case, the disparity value deriving device 3 can detect the position of, for example, a vehicle behind that follows the vehicle 100 or other vehicles running side by side with the vehicle 100. The control device 6 can detect the danger when the vehicle 100 changes lanes or merges into a lane, and execute the above vehicle control. The control device 6 can also execute the above vehicle control when determining that there is a danger of collision while the vehicle 100 is being backed, for example, in a parking space, based on the disparity image of an obstacle behind the vehicle 100 that is detected by the disparity value deriving device 3.

Main Advantageous Effects of Present Embodiment

As described above, in the disparity value deriving device 3 according to the present embodiment, the cost calculator 310 and the cost synthesizer 320 calculate the costs C and the synthesis costs Ls, respectively, based not on the shift amounts d shifted in units of pixels but the discrete shift amounts d included in the decimated shift features. Compared with the calculation based on the shift amounts d shifted in units of pixels, the processing load for calculating the costs C and the synthesis costs Ls can be reduced, the processing speed of the stereo matching process can be improved, and the time required for deriving disparity values can be reduced.

In the disparity value deriving device 3, the subpixel estimator 330 can derive disparity values Δ in units of subpixels, which are units smaller than pixels, and thus can derive accurate and high density disparity values Δ, resulting in a more accurate disparity image.

The discrete shift amounts d included in the decimated shift features used by the cost calculator 310 and the cost synthesizer 320 to calculate the costs C and the synthesis costs Ls, respectively, are set such that the interval between the shift amounts d is reduced (finer) in a region where the values of the shift amounts d are smaller, whereas the interval between the shift amounts d is increased (more coarse) in a region where the values of the shift amounts d are larger. The resolution required for the minimum necessary distance information that satisfies the driving assistance in a vehicle traveling on the road can be thus satisfied.

When the cost C serving as the degree of matching is an evaluation value representing the degree of similarity, the shift amount d at which the synthesis cost Ls is the largest in units of subpixels is the disparity value Δ.

In the foregoing embodiment, the object recognition device 5 calculates the distance Z based on a disparity image (disparity value). However, embodiments are not limited thereto, and the CPU 32 of the image processor 30 of the disparity value deriving device 3 may calculate the distance Z.

According to the embodiments described above, it is possible to reduce the image processing load and reduce the time required for deriving disparity values.

Although the invention has been described with respect to specific embodiments for a complete and clear disclosure, the appended claims are not to be thus limited but are to be construed as embodying all modifications and alternative constructions that may occur to one skilled in the art that fairly fall within the basic teaching herein set forth.

What is claimed is:

1. A disparity value deriving device, comprising: processing circuitry to calculate a plurality of degrees of matching, each between a reference region in a reference image and a different one of a plurality of regions in a comparison image, the plurality of regions being in a designated range and the plurality of regions including a corresponding region corresponding to the reference region;

calculate a synthesized degree of matching by aggregating the degree of matching of the reference region in the reference image and the degrees of matching of plural regions in the comparison image that are on a plurality of paths originating from the corresponding region and extending in different directions; and derive a disparity value of an object imaged in the reference region of the reference image and the corresponding region of the corresponding image based on the synthesized degree of matching, wherein the processing circuitry is configured to calculate the plurality of degrees of matching based on shift amounts by which the plurality of regions in the designated range are shifted from a region corresponding to the reference region in the comparison image, the shift amounts being defined such that a difference between first adjacent shift amounts is less than a difference between second adjacent shift amounts that are further away from the region corresponding to the reference region than the first adjacent shift amounts are from the region corresponding to the reference region, the reference image is captured from a first imaging position, and the comparison image is captured from a second imaging position different from the first imaging position; wherein the processing circuitry is configured to calculate the degrees of matching based on a luminance value of the reference region and luminance values of the plurality of regions specified by shifting positions of the regions by shift amounts included in features obtained by partially removing predetermined shift amounts from a predetermined shift range, corresponding to a position of the reference region, on an epipolar line in the comparison image based on the reference region.

2. An equipment control system, comprising:

the disparity value deriving device according to claim 1; and control circuitry configured to control a control target with distance information from the disparity value deriving device to the object, wherein the distance information is obtained from the disparity value derived by the disparity value deriving device.

3. A movable apparatus, comprising:

a movable body; and the equipment control system according to claim 2.

4. A robot, comprising:

a robotic body; and the equipment control system according to claim 2.

5. The disparity value deriving device according to claim 1, wherein the processing circuitry is further configured to derive the disparity value by subpixel estimation, based on mutually adjacent shift amounts that are included in the shift amounts, included in the features, and include the shift amount corresponding to the first extreme.

6. A disparity value deriving device for deriving a disparity value representing disparity for an object in a reference image obtained by a first imager and in a comparison image obtained by a second imager, the disparity value deriving device comprising:

processing circuitry to calculate respective degrees of matching for a plurality of candidate regions in the comparison image, each candidate region serving as candidates for a corresponding region in the comparison image and the corresponding region corresponding to a first reference region in the reference image, based on a luminance value of the first reference region and luminance values of the candidate regions specified by shifting positions of the candidate regions by shift amounts included in features obtained by partially removing predetermined shift amounts from a predetermined shift range, corresponding to a position of the first reference region, on an epipolar line in the comparison image based on the first reference region;

calculate a synthesized degree of matching by aggregating the degree of matching of the corresponding region with the degrees of matching of plural candidate regions of the plurality of candidate regions, based on the shift amounts included in the features, the plural candidate regions located on a plurality of paths in the comparison image that extend in different directions and originate from the corresponding region in the comparison image; and derive the disparity value, according to the shift amount that corresponds to a first extreme of the synthesized degrees of matching of the respective candidate regions in the comparison image, wherein the shift amounts are defined such that a difference between first adjacent shift amounts is less than a difference between second adjacent shift amounts that are further away from the region corresponding to the reference region than the first adjacent shift amounts are from the region corresponding to the reference region; wherein the reference image is captured from a first imaging position, and the comparison image is captured from a second imaging position different from the first imaging position.

7. The disparity value deriving device according to claim 6, wherein when the shift amounts included in the features are arranged in an ascending order, the features are configured such that a difference in value between adjacent shift amounts increases as values of the shift amounts increase.

8. The disparity value deriving device according to claim 7, wherein the features are formed by the shift amounts according to a desired resolution for a distance to the object that is determined based on the disparity value.

9. The disparity value deriving device according to claim 6, further comprising a storage configured to store the features in advance.

10. The disparity value deriving device according to claim 6, wherein the processing circuitry derives the disparity value by subpixel estimation, based on mutually adjacent shift amounts that are included in the shift amounts, included in the features, and include the shift amount corresponding to the first extreme.

11. The disparity value deriving device according to claim 10, wherein the processing circuitry derives, as the disparity value, a shift amount in units of subpixels corresponding to a second extreme in a quadratic curve passing through three points at coordinates that are defined by a shift amount that corresponds to the first extreme and is included in the shift amounts included in the features, two shift amounts adjacent to that shift amount, and the synthesized degrees of matching corresponding to the shift amounts.

12. The disparity value deriving device according to claim 10, wherein the processing circuitry derives, as the disparity value, a shift amount in units of subpixels corresponding to a third extreme in a quadratic curve defined by the least squares method with four or more points at coordinates that are defined by four or more adjacent shift amounts including the shift amount that corresponds to the first extreme and is included in the shift amounts included in the features, and the synthesized degrees of matching corresponding to the shift amounts.

13. An equipment control system comprising:

the disparity value deriving device according to claim 6; and control circuitry configured to control a control target with distance information from the disparity value deriving device to the object, wherein the distance information is obtained from the disparity value derived by the disparity value deriving device.

14. A movable apparatus, comprising:

a movable body; and the equipment control system according to claim 13.

15. A robot, comprising:

a robotic body; and the equipment control system according to claim 13.

16. A disparity value deriving device, comprising:

processing circuitry to calculate a plurality of degrees of matching, each between a reference region in a reference image and a plurality of discontinuous regions in a comparison image, the plurality of discontinuous regions being in a designated range and the plurality of discontinuous regions including a corresponding region corresponding to the reference region;

calculate a synthesized degree of matching by aggregating the degree of matching of the reference region in the reference image and the degrees of matching of plural discontinuous regions in the comparison image that are on a plurality of paths originating from the corresponding region and extending in different directions; and derive a disparity value of an object imaged in the reference region of the reference image and the corresponding region of the corresponding image based on the synthesized degree of matching, wherein the processing circuitry is configured to calculate the plurality of degrees of matching based on shift amounts by which the plurality of regions in the designated range are shifted from a region corresponding to the reference region in the comparison image, the shift amounts being defined such that a difference between first adjacent shift amounts is less than a difference between second adjacent shift amounts that are further away from the region corresponding to the reference region than the first adjacent shift amounts are from the region corresponding to the reference region, the reference image is captured from a first imaging position, and the comparison image is captured from a second imaging position different from the first imaging position; wherein the processing circuitry is configured to calculate the degrees of matching based on a luminance value of the reference region and luminance values of the plurality of discontinuous regions specified by shifting positions of the discontinuous regions by shift amounts included in features obtained by partially removing predetermined shift amounts from a predetermined shift range, corresponding to a position of the reference region, on an epipolar line in the comparison image based on the reference region.

17. The disparity value deriving device according to claim 16, wherein the processing circuitry derives the disparity value by subpixel estimation, based on mutually adjacent shift amounts that are included in the shift amounts, included in the features, and include the shift amount corresponding to the first extreme.

18. The disparity value deriving device according to claim 17, wherein the processing circuitry derives, as the disparity value, a shift amount in units of subpixels corresponding to a second extreme in a quadratic curve passing through three points at coordinates that are defined by a shift amount that corresponds to the first extreme and is included in the shift amounts included in the features,
two shift amounts adjacent to that shift amount, and
the synthesized degrees of matching corresponding to the shift amounts.

* * * * *